(12) United States Patent
Henry

(10) Patent No.: US 6,206,543 B1
(45) Date of Patent: Mar. 27, 2001

(54) FLASHLIGHT HOLDER ASSEMBLY

(76) Inventor: David Vincent Henry, 144 Blue Ridge La., Seymour, TN (US) 37865

( * ) Notice: Subject to any disclaimer, the term of this patent is extended or adjusted under 35 U.S.C. 154(b) by 0 days.

(21) Appl. No.: 09/439,831

(22) Filed: Nov. 12, 1999

(51) Int. Cl.[7] ................................................... A42B 1/24
(52) U.S. Cl. ..................... 362/191; 362/105; 362/106; 362/103; 362/190; 362/191; 362/396; 362/202; 362/187; 362/188; 362/203
(58) Field of Search ................................. 362/105, 106, 362/103, 190, 191, 396, 202, 187, 188, 203

(56) References Cited

U.S. PATENT DOCUMENTS

| | | | |
|---|---|---|---|
| 4,406,040 | * 9/1983 | Connone | 362/106 |
| 5,199,780 | 4/1993 | Ekman . | |
| 5,438,494 | * 8/1995 | Harlan | 362/106 |
| 5,460,346 | * 10/1995 | Hirsch | 362/191 |
| 5,463,538 | 10/1995 | Womack . | |
| 5,664,868 | * 9/1997 | Montalbano | 362/105 |
| 5,673,502 | * 10/1997 | Caterbone | 362/103 |
| 5,894,604 | * 4/1999 | Crabb et al. | 362/106 |

* cited by examiner

*Primary Examiner*—Sandra O'Shea
*Assistant Examiner*—Anabel M. Ton
(74) *Attorney, Agent, or Firm*—Pitts and Brittian, P. C.

(57) ABSTRACT

A flashlight holder assembly for releasably receiving a flashlight of the type having head rotatable with respect to a barrel for operation thereof. The barrel of the flashlight defines a faceted exterior surface. The holder defines a barrel support and a base. The barrel support defines a faceted internal surface and a slot which cooperate to closely receive the barrel such that the barrel is retained in the barrel support in a non-rotatable manner. The base defines a base plate to which the barrel support is secured. In one embodiment, the holder includes a clip which extends from the base plate and is positioned below the base plate and cooperates with the base plate to receive and retain the periphery of an article therein.

13 Claims, 7 Drawing Sheets

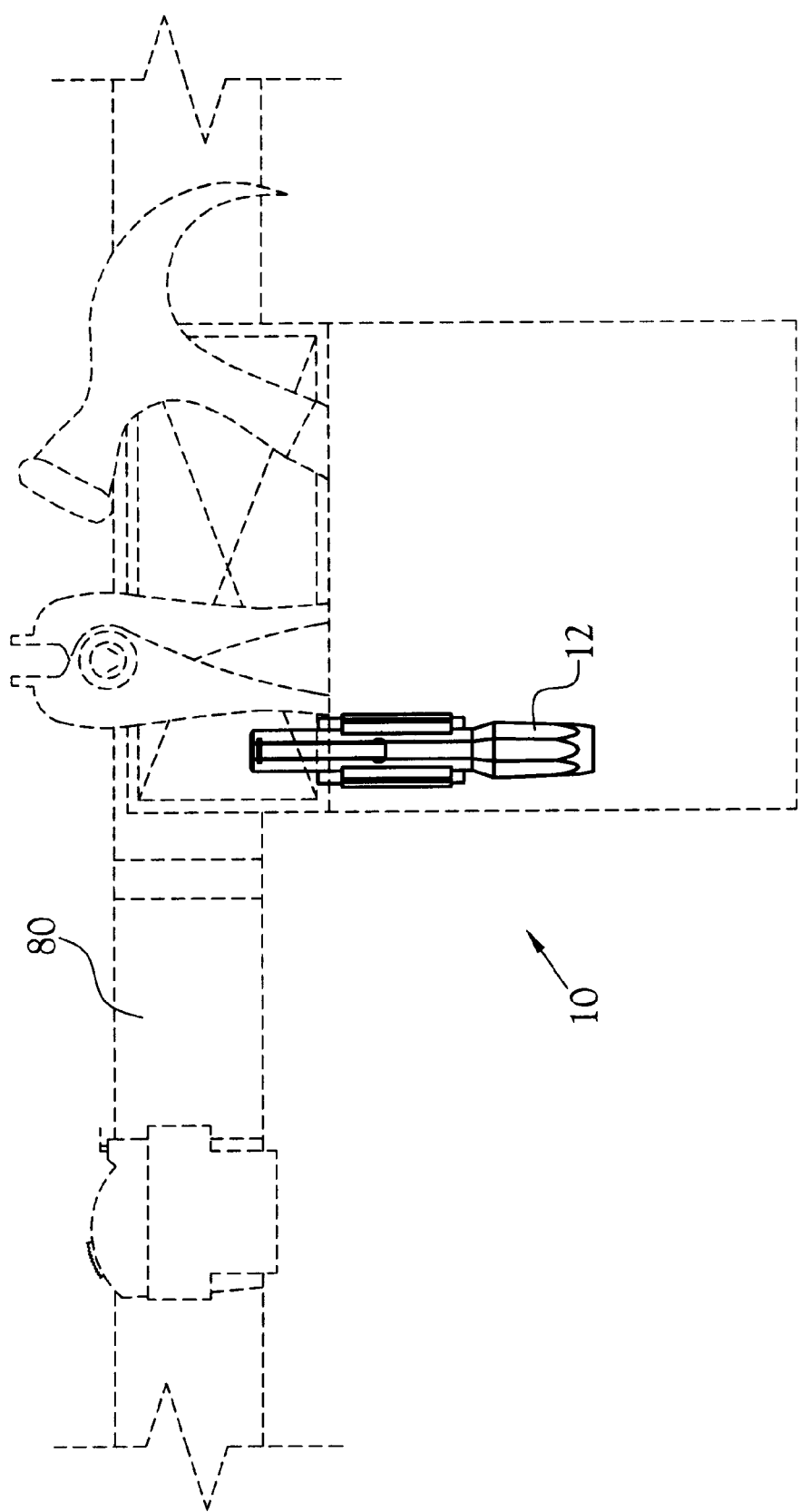

FLASHLIGHT HOLDER ASSEMBLY

CROSS-REFERENCE TO RELATED APPLICATIONS

Not applicable

STATEMENT REGARDING FEDERALLY SPONSORED RESEARCH AND DEVELOPMENT

Not applicable

BACKGROUND OF THE INVENTION

1. Technical Field

This invention relates to the field of flashlights and holders for holding flashlights.

2. Background Art

Flashlights are useful because they are portable and lightweight. In certain situations, it is preferable to place the flashlight in a holder such that both of the user's hands are free. For instance, construction workers often require the use of a flashlight and it is common to affix a holder to a hard hat and insert a flashlight in the holder. Some flashlights commonly used are operated by holding the barrel of the flashlight and twisting the head. One disadvantage of using this type of flashlight in a holder is that it requires two hands to operate the flashlight, one hand being used to hold the barrel and the other to manipulate the head. Otherwise, the flashlight would rotate in the holder.

FIG. 1 is an illustration of a prior art device provided for mounting a flashlight to the brim of a hat. The clip portion of the flashlight holder and the barrel support portion of the holder are parallel to each other. With this configuration, the holder must be mounted to one side of the hat to direct the light from the flashlight in front of the wearer. The light cannot be pointed directly in front of the wearer without the wearer turning his head to one side. Further, although the barrel support portion supports the barrel of the flashlight, the barrel of the flashlight is not inhibited from rotation therein. Accordingly, in order to prevent such rotation, two hands are required to operate the flashlight as described above.

Moreover, conventional flashlight holders are not easily mountable to a surface with screws due to interference of the screw head with the reception of the flashlight barrel in the barrel support portion of the holder.

U.S. Pat. No. 5,199,780 issued on Apr. 6, 1993 to J. M. Ekman and U.S. Pat. No. 5,438,494 issued on Aug. 1, 1995 to B. L. Harlan disclose holders for flashlights. Each holder defines a configuration similar to the prior art device illustrated in FIG. 1. Specifically, each holder defines an attachment device which is parallel to the flashlight barrel support portion such that the holder must be attached to one side of a hat or cap. Also, the barrel support portion of each holder permits the rotation of the flashlight barrel therein.

U.S. Pat. No. 5,460,346 issued on Oct. 24, 1995 to N. Hirsch discloses an article holder which includes a clip and a clamp to which the clip is releasably securable. The clip defines an article 5 holding portion which releasably holds a cylindrical article such as a flashlight. The article holding portion defines a configuration similar to the barrel support portion of the prior art illustrated in FIG. 1 and permits the rotation of the cylindrical article therein.

U.S. Pat. No. 5,463,538 issued on Oct. 31, 1995 to R. C. Womack discloses a portable light source which is mounted on a hat or cap via an adjustable mounting bracket. The light source includes a separate portable power source which communicates with the light source via an electrical connector. The mounting assembly must be secured to an object to support the light source and is not free standing.

Each of the prior art devices disclosed in these patents requires multiple parts, thereby making their use more complicated and costly. Further, the likelihood of destruction is also increased due to the number of parts. Further, each of these devices is provided for a single use. Each is dedicated to holding an item in a single location or for a single particular purpose.

Therefore, it is an object of the present invention to provide a one-piece, multi-purpose flashlight holder assembly that is configured to retain a flashlight therein which can be operated with one hand.

It is another object of the present invention to provide a flashlight holder assembly which can be clipped to cylindrical objects such as handlebars or a tree branch.

Further, it is an object of the present invention to provide a flashlight holder assembly wherein the barrel support and clip of the holder are perpendicular to each other such that the flashlight held in the barrel support of the holder is perpendicular to the surface to which the clip is secured.

Yet another object of the present invention is to provide a flashlight holder assembly wherein the flashlight is linearly adjustable therein.

Moreover, it is an object of the present invention to provide a flashlight holder assembly which serves as an incline/decline stand such that the flashlight can be supported at an angle when the holder is resting on a surface.

It is yet another object of the present invention to provide a flashlight holder assembly wherein the flashlight barrel support of the holder is configured to receive screws through a portion thereof without interfering with the reception of the flashlight barrel.

Further, it is yet another object of the present invention to provide a flashlight holder assembly which defines an elevated base to provide clearance between the flashlight head and the surface such that the flashlight remains operable when mounted in such a manner.

BRIEF SUMMARY OF THE INVENTION

Other objects and advantages will be accomplished by the present invention which provides a flashlight holder assembly for use with a flashlight having a barrel which defines a faceted exterior surface, the flashlight being releasably securable within the flashlight holder assembly. The flashlight further includes a head which is rotatable with respect to the barrel for operation of the flashlight. The flashlight holder assembly defines a barrel support and a base. The barrel support defines a faceted internal surface for engaging the faceted barrel of the flashlight such that the barrel is prevented from rotation relative to the flashlight holder assembly. The flashlight is linearly adjustable within the barrel support. A slot is defined for allowing the holder to expand for insertion of the flashlight barrel, thus creating a retaining force on the flashlight when inserted therein. The base defines a base plate to which the barrel support is secured.

A clip is provided for mounting the flashlight holder assembly to objects such as hard hats, baseball-type hats, a tool belt, bicycle handle bars, a pocket, and other conventional devices. The clip is removable for permanently mounting the flashlight holder to a flat surface such as a wall or any location where access to a flashlight would be useful or where a flashlight serves as an emergency lamp. For example, the clip is mountable to the inside of a cabinet door of a home, or near emergency equipment of a recreational vehicle, a home or a boat. The flashlight barrel support and the clip are oriented such that the flashlight is disposed perpendicularly to the edge of the object on which the flashlight holder assembly is mounted. Specifically, when the flashlight holder assembly is mounted on the bill or brim of a hat, or on the handlebars of a bicycle, the flashlight is aimed directly in front of the user. When the flashlight holder assembly is carried on a tool belt, however, the flashlight is aimed downwardly, thus protecting the lens from damage that may be caused by the insertion of tools into a tool pouch.

BRIEF DESCRIPTION OF THE SEVERAL VIEWS OF THE DRAWINGS

The above-mentioned features of the invention will become more clearly understood from the following detailed description of the invention read together with the drawings in which:

FIG. 7 illustrates an embodiment of the flashlight holder assembly of the present invention where the holder is mounted on a tool belt;

DETAILED DESCRIPTION OF THE INVENTION

A flashlight holder assembly incorporating various features of the present invention is illustrated generally at 10 in the figures. The flashlight holder assembly is fabricated from a one-piece construction and configured to be used as a multi-purpose flashlight holder. The flashlight holder assembly 10 is designed such that a flashlight can be operated with one hand when retained in the holder. Moreover, in the preferred embodiment, the flashlight holder assembly 10 is designed such that the flashlight is held perpendicularly to the surface edge to which the clip portion of the holder is secured. To this extent, the holder is configured such that the barrel support thereof is configured to receive screws without interfering with the reception of the flashlight barrel of the flashlight. Also, the flashlight holder assembly is configured to serve as an incline/decline stand when the holder is resting on a support surface.

Figure 1:
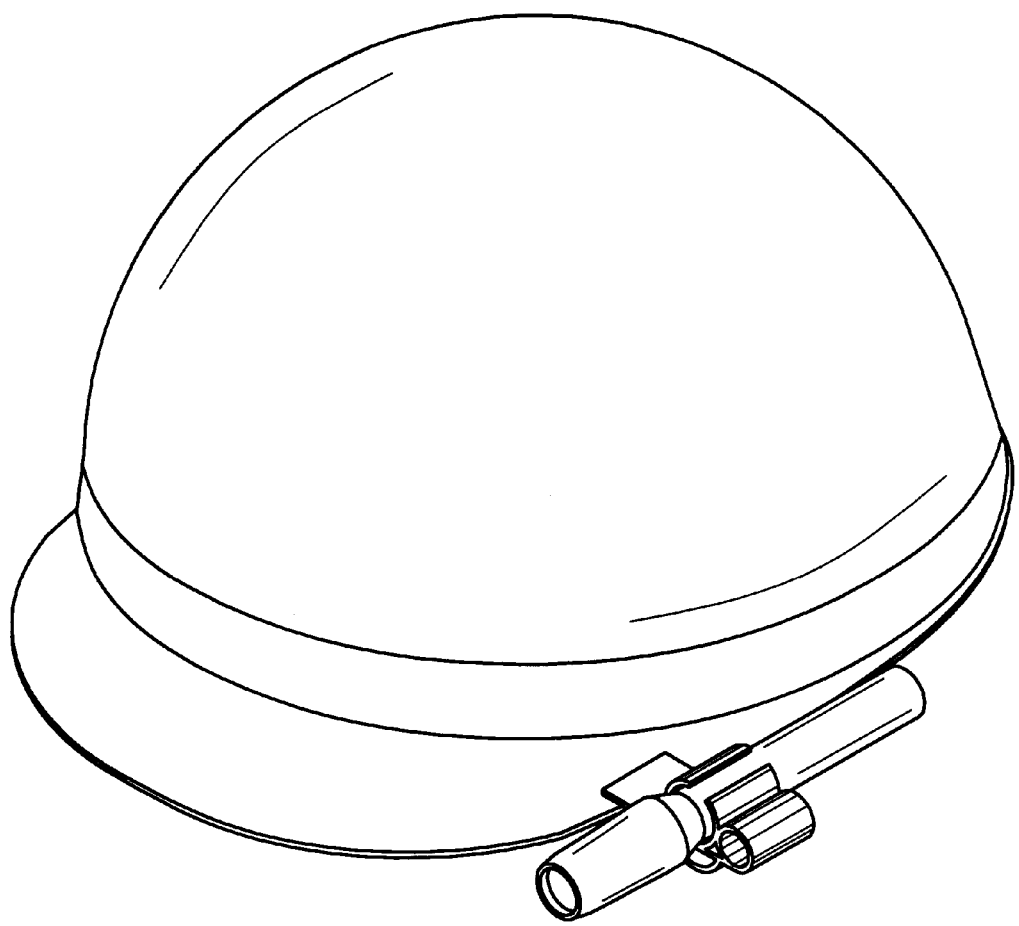
FIG. 1 is a perspective view of a prior art device wherein a flashlight is retained within a holder and the holder is clipped to a hat.
Figure 2:
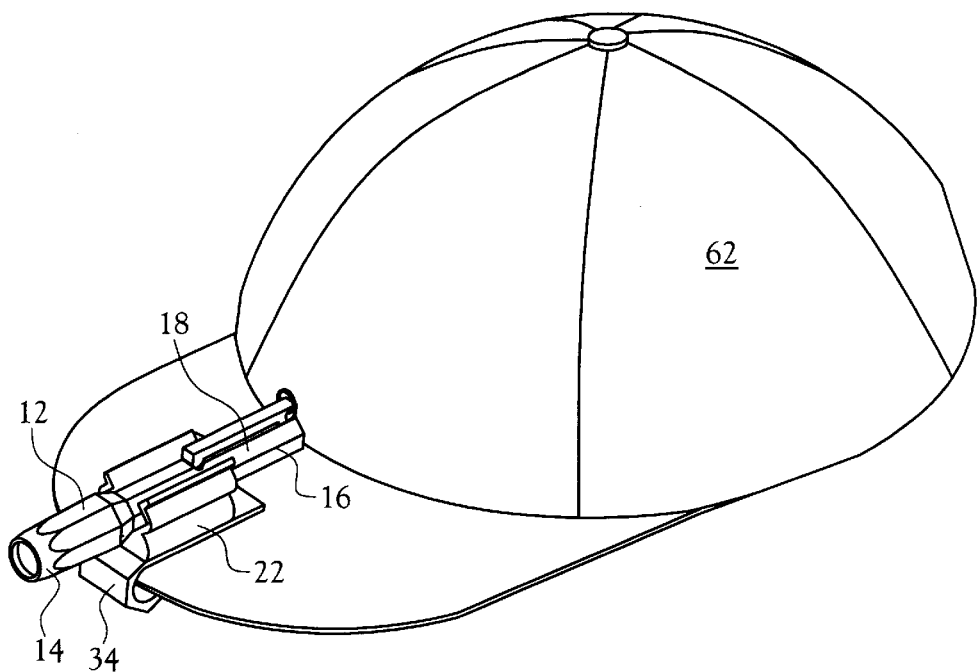
FIG. 2 illustrates an embodiment of the flashlight holder assembly of the present invention where the holder is mounted on the brim of a baseball cap.

FIG. 2 illustrates an embodiment of the flashlight holder assembly 10 of the present invention mounted on a baseball-type cap 62. The flashlight holder assembly 10 is adapted to releasably receive a flashlight 12. The flashlight 12 defines a barrel 16 and a head 14. The head 14 is rotatable relative to the barrel 16 for operation of the flashlight 12. This operation of the flashlight 12 is well known in the art. The exterior surface 18 of the barrel 16 is faceted. In the illustrated embodiment, the flashlight barrel exterior surface 18 defines eight faces 19, as most clearly illustrated in FIG. 10.

Figure 3A:
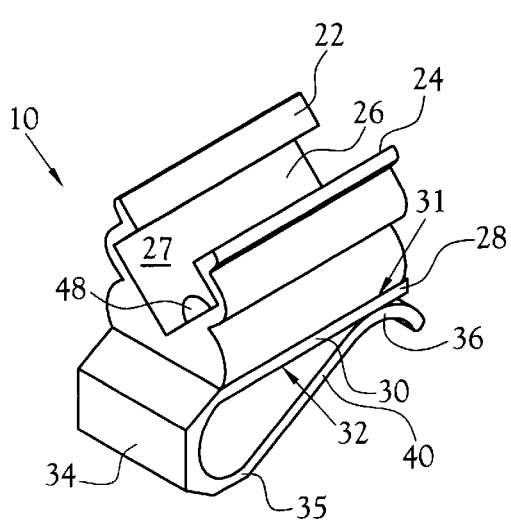
FIG. 3a is a perspective view of the flashlight holder assembly illustrated in FIG. 2 showing the extended portion of the base removed.
Figure 3B:
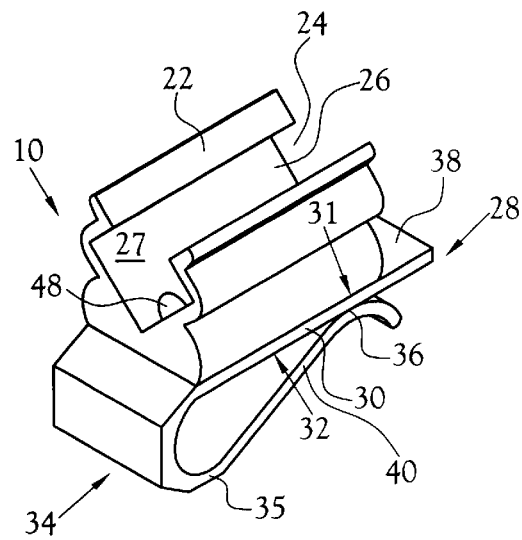
FIG. 3b is a perspective view of an embodiment of the flashlight holder assembly illustrated in FIG. 2.

A first embodiment of the flashlight holder assembly 10 is most clearly shown in FIGS. 3a and 3b. Generally, the holder 10 defines a barrel support 22 which is secured to a base 28. The barrel support 22 defines an interior surface 26 and a slot 24 which cooperate to closely receive the exterior surface 18 of the barrel 16 of the flashlight 12. Specifically, the interior surface 26 is faceted for receiving the faceted exterior surface 18 of the barrel 16 of the flashlight 12 and retaining it in a non-rotatable manner therein. The slot 24 permits the expansion of the interior surface 26 to accommodate the barrel 16 of the flashlight 12, thus creating a retaining force on the flashlight barrel 16 when inserted therein. The flashlight barrel 16 is linearly adjustable within the barrel support 22. In the preferred embodiment, the barrel support 22 defines four faces 27 which are configured to contact four alternating faces 19 of the faceted exterior surface 18 of the flashlight barrel 16, shown most clearly in FIG. 10.

The base 28 of the holder 10 serves to support the barrel support 22 thereon and includes at least a base plate 30. The barrel support 22 is secured to an upper surface 31 of the base plate 30. In the embodiment of the holder 10 illustrated in FIGS. 2–7, the base 28 further includes a clip 34 extending from and positioned below the base plate 30.

Figure 4A:
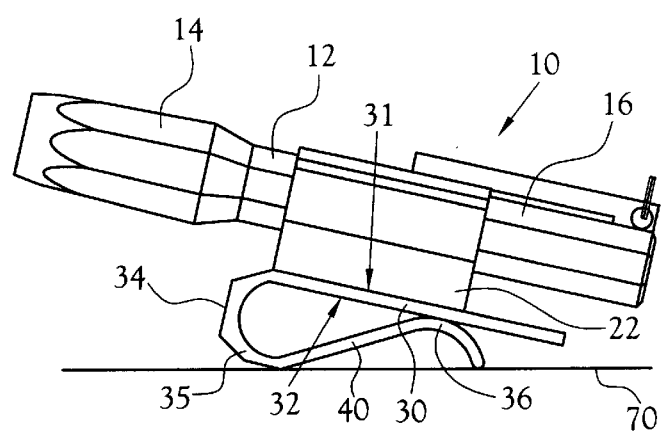
FIG. 4a illustrates an embodiment of the flashlight holder assembly of the present invention wherein the holder is resting on a surface and serves as an incline stand.
Figure 4B:
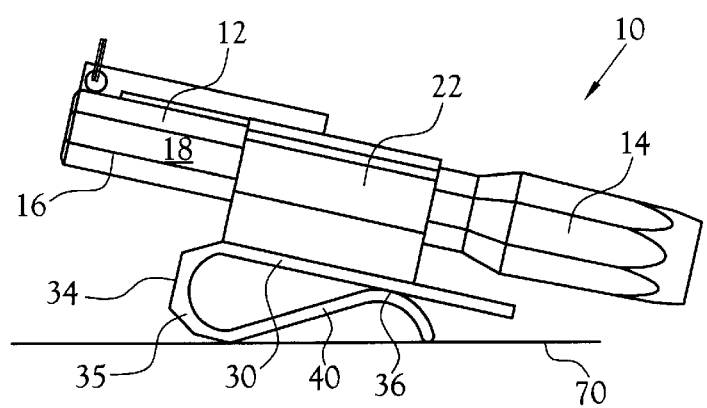
FIG. 4b illustrates an embodiment of the flashlight holder assembly of the present invention wherein the holder is resting on a surface and serves a decline stand.

FIGS. 3a, 3b, 4a and 4b clearly illustrate the clip 34 of the base 28. It will be noted that, in FIGS. 3b, 4a and 4b, the base plate 30 defines an extension 38 which extends beyond the back of the barrel support 22 and provides stability. The clip 34 cooperates with the base plate 30 to securely fasten to an object. In the preferred embodiment, the clip 34 defines an S-shape configuration and includes a receptor opening 35. A nip 36 is defined between a recurved portion 40 of the clip 34 and the base 28. The receptor opening 35 cooperates with the lower surface 32 of the base plate 30 to receive the periphery of an object therein. The clip 34 is biased toward the base plate 30 and serves to securely hold the periphery of the object between the receptor opening 35 and the lower surface 32 of the base plate 30. Further, the receptor opening 35 is enlarged such that when the clip 34 rests on a surface 70, the base plate 30 and the barrel support 22 rest at an angle relative to the surface 70, as shown in FIGS. 4a and 4b.

Figure 5:
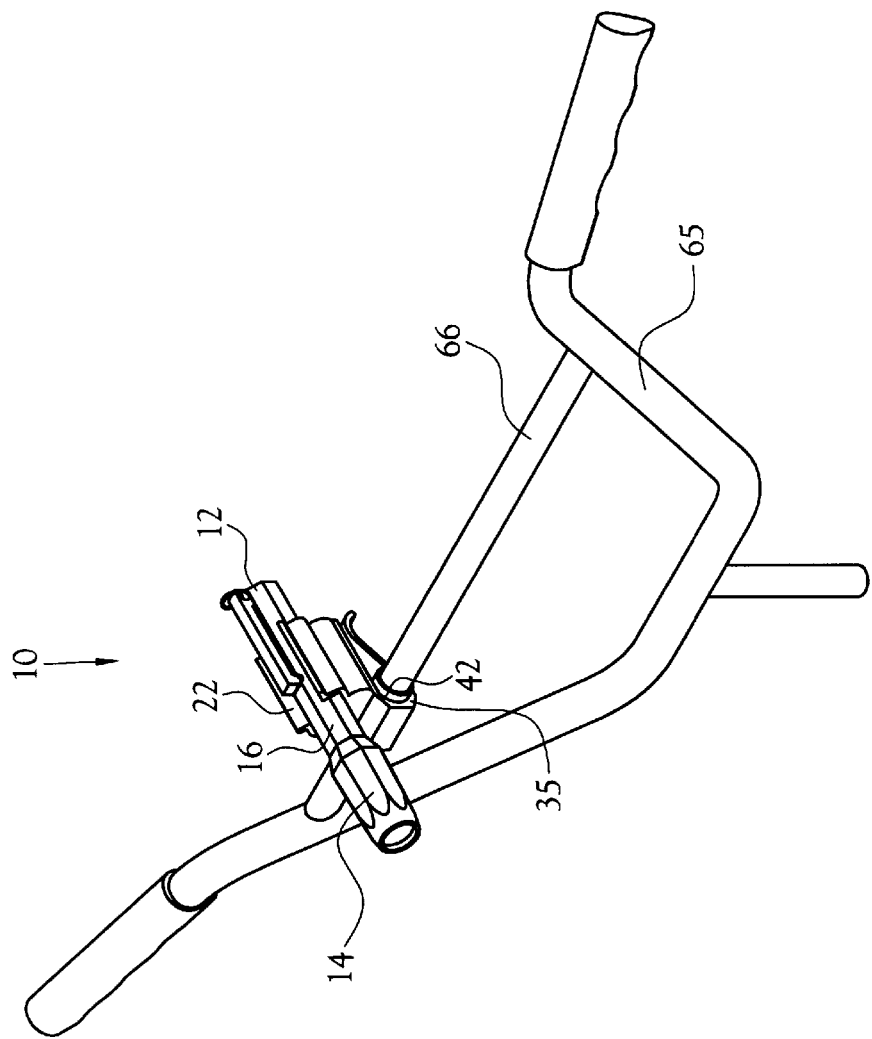
FIG. 5 illustrates an embodiment of the flashlight holder assembly of the present invention where the holder is mounted on the handlebars of a bicycle.
Figure 6:
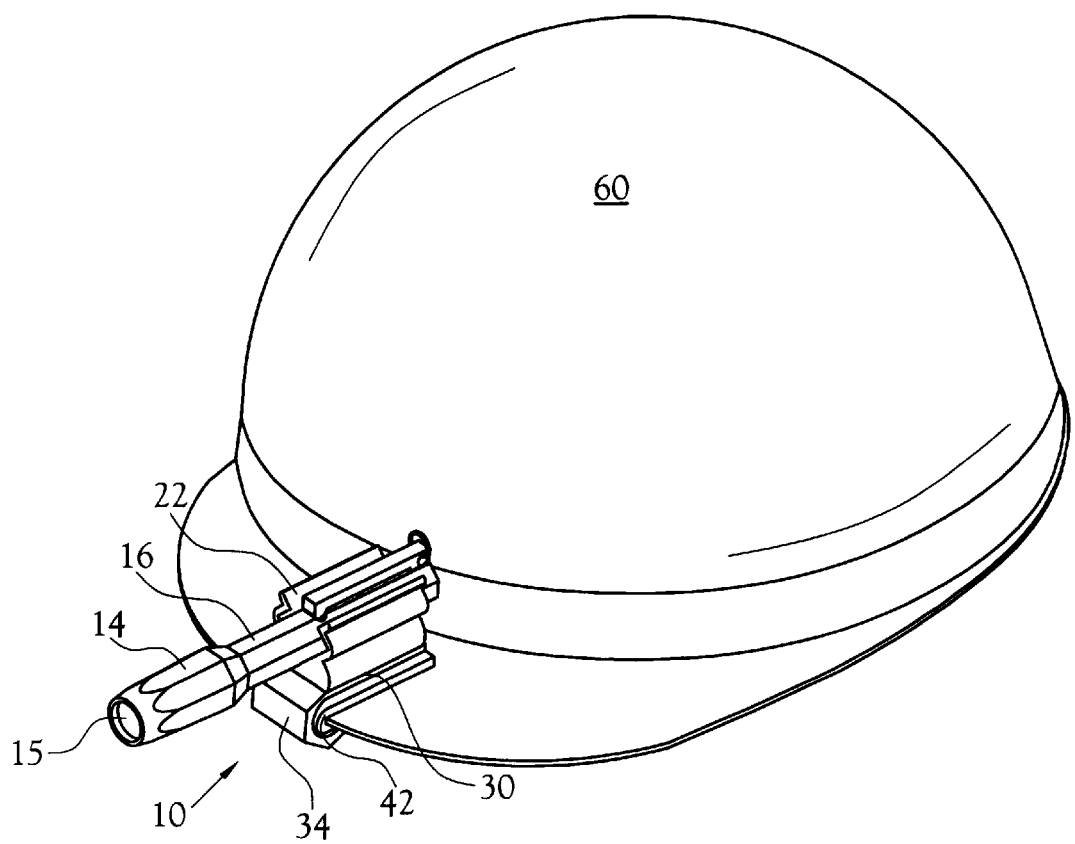
FIG. 6 illustrates an embodiment of the flashlight holder assembly of the present invention where the holder is mounted on a hard hat.

FIGS. 2, 4a, 4b and 5–7 illustrate a few examples of the use of the embodiment of the flashlight holder assembly 10 of the present invention which includes the clip 34. FIGS. 2 and 6 illustrate the use of the flashlight holder assembly 10 on a baseball cap 62 and a construction hat 60, respectively. In both cases, the clip 34 of the holder 10 is secured to the brim As illustrated in FIG. 6, in some applications an insert 42 is mounted on the article and received in the clip 34 to provide resistance such that the clip 34 does not move with respect to the article to which the clip 34 is attached. Specifically, the insert 42 extends between the lower surface 32 of the base plate 30 and the receptor opening 35, as shown in FIG. 6.

FIGS. 4a and 4b illustrate the flashlight holder assembly 10 serving as an incline/decline stand. Specifically, the clip 34 is configured such that when it rests on a surface 70, the base plate 30 and the barrel support 22 are directed at an angle relative to the surface 70. With this configuration, the flashlight 12 is directed upwardly, as in FIG. 4a, or directed downwardly, as in FIG. 4b. Because the flashlight 12 is in line with the clip 34 of the holder 10, the holder 10 can rest on a surface in a stable manner. Further, it will be noted that the clip 34 is wider than the flashlight 12, thereby adding stability.

In FIG. 5, the flashlight holder assembly 10 is mounted on a crossbar 66 of bicycle handlebars 65. The receptor opening 35 is large enough to accommodate the crossbar 66 with the recurve portion 40 of the S-shape contour, as described above, providing a means for accommodating the cylindrical shape within the clip 34. Again, it may be preferable to utilize an insert 42 or other device to provide resistance such that the holder 10 is maintained in the desired position.

FIG. 7 illustrates the flashlight holder assembly 10 clipped to a tool belt 80. Specifically, the holder 10 is clipped to the tool belt 80 and the flashlight 12 can be removed for use and reinserted into the holder 10 without removing the holder assembly 10 from the belt 80. Alternatively, the holder assembly 10 is removable from the tool belt 80 and mountable for use on a selected device such as the bill of a construction cap 62 or hat 60 as illustrated in FIGS. 2 and 6, respectively. It will be noted that because the clip 34 and the flashlight 12 are in line, the flashlight 12 is vertically supported on the tool belt 80. Further, the barrel support 22 of the holder 10 securely supports the barrel 16 of the flashlight 12 in such a manner that the flashlight 12 does not slide out of the holder 10 due to the effects of gravity. Further, when using the flashlight holder assembly 10 in this manner the head of the flashlight 12 should point downward such that the lens 15 of the flashlight 12 is not damaged when tools are inserted into the belt 80.

Figure 8:
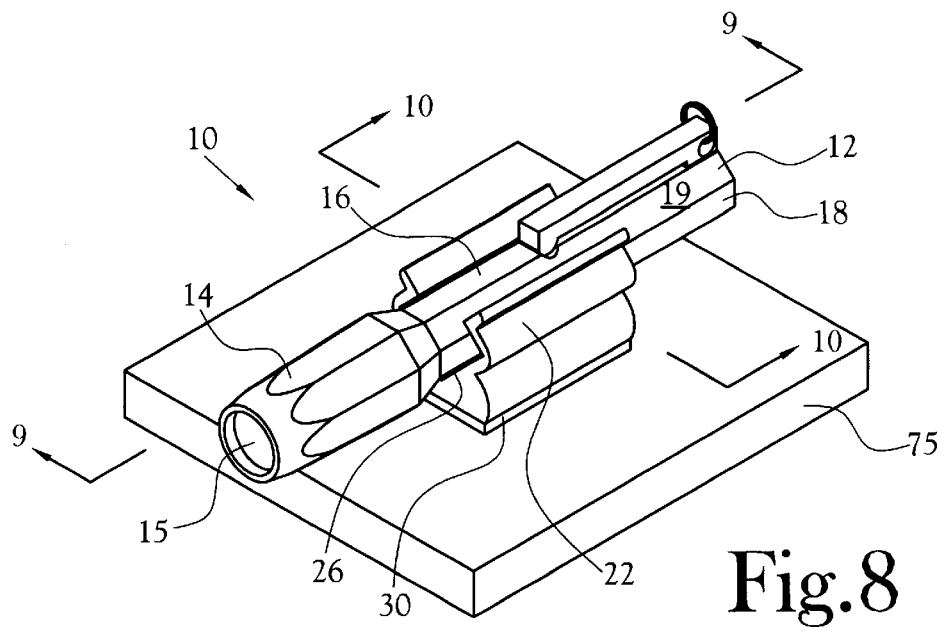
FIG. 8 is a perspective view of the flashlight holder assembly of the present invention illustrating an alternate embodiment of the holder wherein the holder is mounted to a surface with the flashlight remaining functional.
Figure 9:
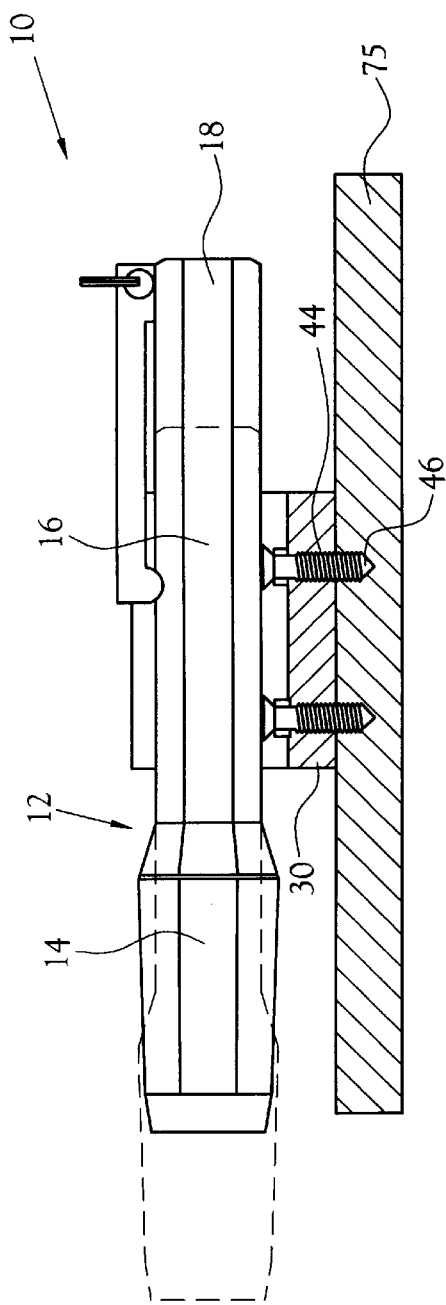
FIG. 9 is a cross-sectional view of the flashlight holder assembly of FIG. 8 taken along line 9—9; and, FIG. 10 is a cross-sectional view of the flashlight holder assembly of FIG. 8 taken along line 10—10.
Figure 10:
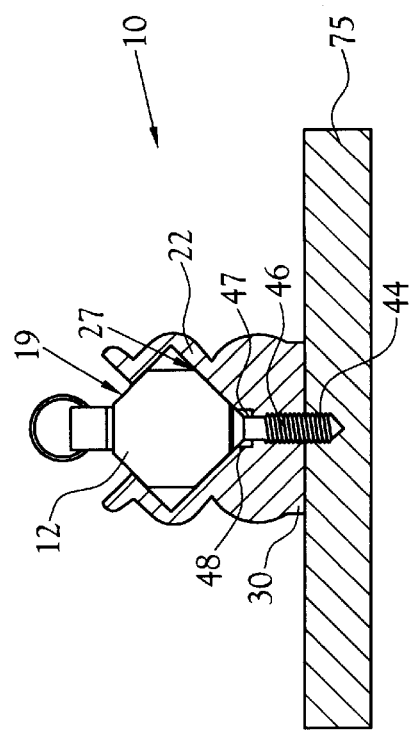

FIGS. 8–10 illustrate an alternate embodiment of the holder 10 which is configured to be mountable to a flat surface 75 such as a wall or other location where access to a flashlight would be useful or where the flashlight serves as an emergency lamp such that the flashlight 12 remains functional. To this extent, the height of the base 28 is configured to elevate the flashlight 12 above the surface 70 a distance to allow the flashlight head 14 to rotate without interference from the mounting surface 70. The flashlight 12 is supported in the barrel support 22 and is slidable in the barrel support 22, as shown in FIG. 9. The base 28 consists of the base plate 30. The base plate 30 and the barrel support 22 define at least one screw opening 44 for receiving a screw 46 therethrough. In the preferred embodiment, the barrel support 22 and base plate 30 define two screw openings 44 which are spaced apart, as shown most clearly in FIG. 9. Specifically, FIG. 9 illustrates two screws 46 spaced apart and passing through the barrel support 22 and the base plate 30 and into the surface 75 to secure the holder 10 to the surface 75.

FIG. 10 illustrates a cross-sectional end view of the flashlight holder assembly 10. The lower faces 27 of the interior surface 26 of the barrel support 22 define countersink slots 48 proximate each screw opening 44 for receiving the head 47 of the each screw 46, shown most clearly in FIG. 10. As discussed above and illustrated in FIG. 10, the four faces 27 of the barrel support 22 contact four alternating faces 19 of the eight faces of the exterior surface 18 of the barrel 16 of the flashlight 12. With this configuration, the head 47 of the screw 46 is situated between the two lower faces 27 of barrel support 22 without interfering with the passage of the flashlight barrel 16 through the barrel support 22.

From the foregoing description, it will be recognized by those skilled in the art that a flashlight holder assembly offering advantages over the prior art has been provided. Specifically, the flashlight holder assembly is fabricated from a one-piece construction and is useful for multiple purposes. Moreover the flashlight holder assembly is designed such that the flashlight is operable with one hand when retained in the holder assembly. Moreover, the flashlight is supported perpendicularly to the edge of the surface to which the holder assembly is secured. Further, the holder is configured such that the barrel support of the holder is configured to receive screws through a portion thereof without interfering with the reception of the flashlight barrel of the flashlight. Also, the holder is configured to serve as an incline/decline stand such that the flashlight can be supported at an angle when the holder is resting on a surface.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A flashlight holder assembly for releasably receiving a flashlight, the flashlight including a faceted barrel and a head, the head being rotatable with respect to the barrel for operation of the flashlight, said flashlight holder assembly comprising:

a barrel support defining a faceted internal surface adapted to closely receive the faceted flashlight barrel, said barrel support preventing rotation of the flashlight barrel such that operation of the flashlight by rotation of the flashlight head does not impart rotation of the flashlight barrel, said barrel support further defining a slot along a length thereof to assist in opening said barrel support for receipt of the flashlight barrel; and a base defining a base plate having an upper surface and a lower surface, said barrel support being secured to said upper surface of said base plate, said base being adapted to be releasably mounted to a selected object for disposition of the flashlight.

2. The flashlight holder assembly of claim 1 wherein said base further includes a clip extending from said base plate and being positioned below said base plate, said clip being adapted to cooperate with said lower surface of said base to releasably mount said flashlight holder assembly to a selected article.

3. The flashlight holder assembly of claim 2 wherein said clip defines a receptor opening and a nip, said receptor opening and said lower side of said base plate receiving the periphery of the article therebetween, said nip being biased toward said lower surface of said base plate to securely hold the article between said receptor opening and said lower surface of said base plate.

4. The flashlight holder assembly of claim 3 wherein said receptor opening is enlarged such that when said clip rests on a surface said base plate and said barrel support rest at an angle relative to the surface.

5. The flashlight holder assembly of claim 2 further comprising an insert adapted to be received in said clip to provide resistance such that said clip does not move with respect to the article on which said flashlight holder assembly is mounted.

6. The flashlight holder assembly of claim 1 wherein said base plate defines an extension member for providing stability when mounted to a selected article.

7. The flashlight holder assembly of claim 1 wherein said faceted internal surface of said barrel support defines fewer faces than said faceted exterior surface of said barrel such that at least one opening is defined between the flashlight barrel and said barrel support, said at least one opening being used to receive a selected fastener.

8. The flashlight holder assembly of claim 7 wherein said base plate and said barrel support define at least one screw opening for receiving a screw therethrough, said at least one screw opening being positioned to receive said selected fastener within said opening defined between the flashlight barrel and said barrel support.

9. A flashlight holder assembly for releasably receiving a flashlight, the flashlight including a faceted barrel and a head, the head being rotatable with respect to the barrel for operation of the flashlight, said flashlight holder assembly comprising:

a barrel support defining a faceted internal surface adapted to closely receive the faceted flashlight barrel, said barrel support preventing rotation of the flashlight barrel such that operation of the flashlight by rotation of the flashlight head does not impart rotation of the flashlight barrel, said barrel support further defining a slot along a length thereof to assist in opening said barrel support for receipt of the flashlight barrel, said faceted internal surface of said barrel support defining fewer faces than said faceted exterior surface of said barrel, such that at least one opening is defined between the flashlight barrel and said barrel support, said at least one opening being used to receive a selected fastener; and a base defining a base plate having an upper surface and a lower surface, said barrel support being secured to said upper surface of said base plate, said base being adapted to be releasably mounted to a selected object for disposition of the flashlight, said base further includes a clip extending from said base plate and being positioned below said base plate, said clip being adapted to cooperate with said lower surface of said base to releasably mount said flashlight holder assembly to a selected article, said base plate and said barrel support defining at least one screw opening for receiving a screw therethrough, said at least one screw opening being positioned to receive said selected fastener within said opening defined between the flashlight barrel and said barrel support.

10. The flashlight holder assembly of claim 9 wherein said clip defines a receptor opening and a nip, said receptor opening and said lower side of said base plate receiving the periphery of the article therebetween, said nip being biased toward said lower surface of said base plate to securely hold the article between said receptor opening and said lower surface of said base plate.

11. The flashlight holder assembly of claim 10 wherein said receptor opening is enlarged such that when said clip rests on a surface said base plate and said barrel support rest at an angle relative to the surface.

12. The flashlight holder assembly of claim 9 further comprising an insert adapted to be received in said clip to provide resistance such that said clip does not move with respect to the article on which said flashlight holder assembly is mounted.

13. The flashlight holder assembly of claim 9 wherein said base plate defines an extension member for providing stability when mounted to a selected article.

* * * * *